G. R. HOLLAND.
FUEL MIXER.
APPLICATION FILED NOV. 8, 1917.
1,281,962.
Patented Oct. 15, 1918.
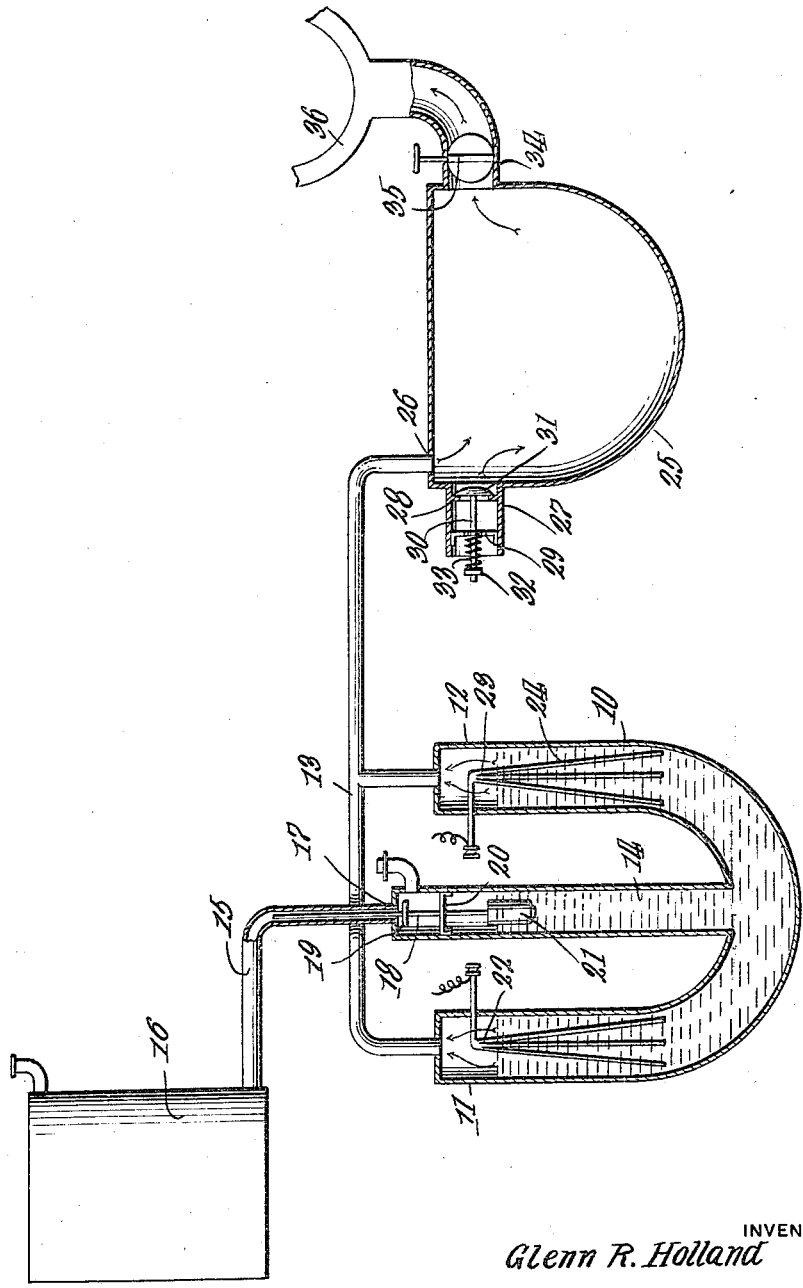
INVENTOR
Glenn R. Holland
WITNESSES
BY
ATTORNEY

UNITED STATES PATENT OFFICE.

GLENN R. HOLLAND, OF GENESEE, ILLINOIS.

FUEL-MIXER.

1,281,962.   Specification of Letters Patent.   Patented Oct. 15, 1918.

Application filed November 8, 1917. Serial No. 201,001.

*To all whom it may concern:*

Be it known that I, GLENN R. HOLLAND, a citizen of the United States, residing at Genesee, in the county of Henry and State of Illinois, have invented certain new and useful Improvements in Fuel-Mixers, of which the following is a specification.

This invention has relation to gas generating apparatus, with particular reference to the use of such apparatus in connection with automobiles and internal combustion engines, and has for an object to provide, an apparatus for generating gas by the electrical decomposition of water so as to form a source of fuel supply for the engine.

Another object of the invention is to provide a gas generating apparatus of the nature above set forth including a generating chamber with a valve controlled fluid supply therefor, and a mixing chamber in communication with the gas generating chamber having a valve to permit the introduction of predetermined quantities of fresh air with the combustible gases, to dilute the same whereby they may be fed in a diluted condition to the internal combustion engine for explosion in its chambers.

In addition to the foregoing my invention comprehends improvements in the details of construction and arrangement of the parts to be hereinafter more fully described and particularly set forth in the appended claim.

With reference to the drawings, forming a part of this application, in which I have illustrated in section a gas generating apparatus, constructed in accordance with my invention, 10 indicates the gas generating apparatus generally in the form of a U-shaped tube, the columns 11 and 12 of which are directed upwardly and formed with openings at their upper ends which are connected to a supply pipe 13. At the intermediate or bight portion of the gas generating apparatus proper, a tube 14 is erected vertically in communication with the interior thereof, and in communication at its upper end by means of a pipe 15 with a container 16, mounted at an elevation above said tube 14. A valve seat 17 is formed at the upper end of the tube 14, and a valve stem 18 is movable within the pipe 15 with a valve 19 secured thereto for engagement upon the seat 17, the valve stem being guided in a bearing 20, and having a float 21 at its lower end.

Electrodes 22 and 23 are provided in the gas generating apparatus, one in each vertical column 11 and 12, each electrode being in the form of downwardly diverging fingers 24, with the upper end of the electrode extending laterally through an opening in the column for connection to a source of current supply, (not shown).

A mixing chamber 25 is provided with an opening 26 to which the pipe 13 is connected. An intake branch 27 is also provided in said mixing chamber and formed with a valve seat 28 and a guide 29 in said branch. The guide supports for movement a valve stem 30 having a valve 31 thereon, for engagement upon the valve seat 28, the outer end of the stem being threaded to receive a nut 32. A coil spring 33 is then interposed between said nut and the guide 29 whereby to lightly retain the valve 31 upon its seat.

An outlet branch 34 is provided for the mixing chamber at a point opposite the intake branch 27, said outlet branch being controlled by means of a throttle valve 35 and adapted for connection to the intake manifold 36 of an internal combustion engine.

In operation, the container 16 is filled with water which flows therefrom, through the pipe 15 into the tube 14 of the gas generating apparatus, filling said tube and the columns 11 and 12 to a point adjacent the upper end thereof. When the level of the water reaches the float 21 the valve 19 is held upon its seat and the further supply of water discontinued. The water is then rendered conductive to electricity by dissolving potassium hydroxid, or other chemical for a similar purpose, and the terminals of the source of current supply of high amperage are connected to the electrode 22 and 23. Oxygen and hydrogen gases are then evolved by decomposition of water and conducted through the pipe 13 to the mixing chamber 25. At each intake stroke of the engine a certain portion of the mixed hydrogen and oxygen gases are drawn, together with a quantity of fresh air into the intake manifold of the internal combustion engine and thence into the cylinders for explosion.

The tension of the spring 33 is adjusted by means of a nut 32 so as to regulate the proportion of fresh air to mixed gases. The throttle valve 35 may also be adjusted so as to regulate the quantity of gases admitted to the intake manifold. As the level of water in the gas generating apparatus falls through the electrical action thereon, it is replenished from the container 16 the float 21 falling with the level of the water so as to slightly unseat the valve 19.

Thus it will be seen that I have provided an apparatus which is inherently capable of generating gas from easily obtained material, the apparatus being especially desirable in automobiles using internal combustion engines, the electrical generator being utilizable to generate the current for the decomposition of water. This apparatus may be used in connection with the regulation carbureter thereby permitting the use of gaseous fuel formed partly of hydrocarbon saturated air and properly mixed hydrogen and oxygen gases with a requisite portion of fresh air to dilute the hydrogen and oxygen gases, and to form an explosive mixture for the carbureted air. As the combustion of hydrogen and oxygen results in the production of a high temperature it will readily be seen that the efficiency of an internal combustion engine will be greatly increased due to an increased expansive force within the cylinder, not to mention the desirable effect in ridding the cylinders of deposits of carbon and to retain them in a clean condition.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention or the scope of the appended claim.

Having thus described my invention what I claim as new and desire to secure by Letters Patent is:—

In a gas generating apparatus, the combination with a U-shaped water-container having a tube upstanding from its bend between its columns, the upper ends of the latter being closed, a pipe leading from said upper ends, and pendant electrodes within the columns; of a source of water supply, a pipe leading from the same into the upper end of the intermediate tube, a control valve for said pipe, and a float within said tube connected with the valve, for the purpose set forth.

In testimony whereof I affix my signature in presence of two witnesses.

GLENN R. HOLLAND.

Witnesses:
FRANK HOLLAND,
THOMAS H. TAYLOR.

Copies of this patent may be obtained for five cents each, by addressing the "Commissioner of Patents, Washington, D. C."